(12) United States Patent
Jung et al.

(10) Patent No.: US 10,324,622 B2
(45) Date of Patent: Jun. 18, 2019

(54) DATA STORAGE DEVICE AND OPERATING METHOD THEREOF

(71) Applicant: SK hynix Inc., Gyeonggi-do (KR)

(72) Inventors: Byung Soo Jung, Gyeonggi-do (KR); Dong Yeob Chun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 112 days.

(21) Appl. No.: 15/238,546

(22) Filed: Aug. 16, 2016

(65) Prior Publication Data
US 2017/0277434 A1 Sep. 28, 2017

(30) Foreign Application Priority Data
Mar. 25, 2016 (KR) .......... 10-2016-0036154

(51) Int. Cl.
*G06F 12/00* (2006.01)
*G06F 3/06* (2006.01)

(52) U.S. Cl.
CPC .......... *G06F 3/0604* (2013.01); *G06F 3/0659* (2013.01); *G06F 3/0688* (2013.01)

(58) Field of Classification Search
CPC ..... G06F 3/0604; G06F 3/0659; G06F 3/0688
See application file for complete search history.

(56) References Cited

U.S. PATENT DOCUMENTS

2015/0095605 A1* 4/2015 Roberts ................ G06F 3/0659
711/167

FOREIGN PATENT DOCUMENTS

KR 1020110118296 10/2011

* cited by examiner

*Primary Examiner* — Shawn X Gu
(74) *Attorney, Agent, or Firm* — IP & T Group LLP

(57) ABSTRACT

A data storage device includes: a plurality of nonvolatile memory devices; and a controller suitable for receiving a command and executing the command for the plurality of nonvolatile memory devices. The controller includes: a first queue suitable for storing the command; and a command manager suitable for managing the command in the first queue, based on a first attribute of the command and queue information of the first queue.

19 Claims, 11 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean application number 10-2016-0036154, filed on Mar. 25, 2016, in the Korean Intellectual Property Office, which is incorporated herein by reference in its entirety.

BACKGROUND

1. Technical Field

Various embodiments of the present invention generally relate to a data storage device and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices can be embedded in external devices or fabricated separately and then connected afterwards.

SUMMARY

In an embodiment, a data storage device may include: a plurality of nonvolatile memory devices; and a controller suitable for receiving a command and executing the command for the plurality of nonvolatile memory devices, wherein the controller may include: a first queue suitable for storing the command; and a command manager suitable for managing the command in the first queue, based on a first attribute of the command and queue information of the first queue.

In an embodiment, an operating method of a data storage device may include: receiving a command; and managing the command in a first queue, based on a first attribute of the command and queue information of the first queue.

In an embodiment, a data storage device may include: a plurality of nonvolatile memory devices; and a controller suitable for receiving and storing a first command for the plurality of nonvolatile memory devices in a queue; if a second command is received, reordering the first and second commands based on attribute of the second command and the first command stored in the queue, and executing the first and second commands according to the reordering result.

DETAILED DESCRIPTION

Figure 1:
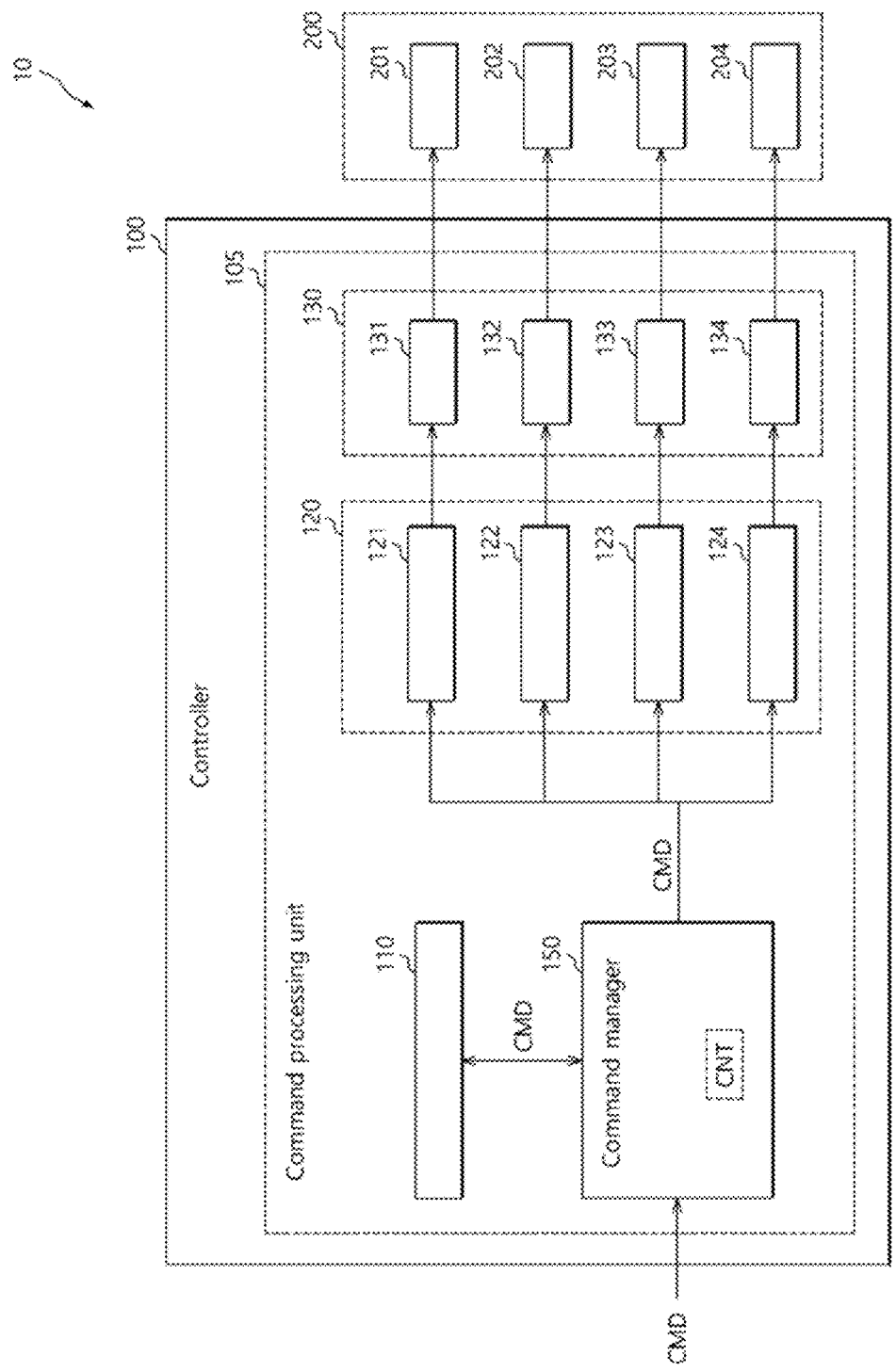
FIG. 1 is a block diagram illustrating a data storage device including a command manager, according to an embodiment of the present invention.

Hereinafter, various embodiments of a data storage device and an operating method thereof according to the present invention will be described with reference to the accompanying drawings. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

Referring now to FIG. 1 a data storage device 10 is provided according to an embodiment of the present invention.

The data storage device 10 may be configured to store data provided from an external device (not shown), in response to a write command CMD from the external device. Also, the data storage device 10 may be configured to provide stored data to the external device, in response to a read command CMD from the external device.

The data storage device 10 may be configured by a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 10 may include a controller 100 and a plurality of nonvolatile memory devices 200, for example, nonvolatile memory devices 201-204.

The controller 100 may control the operations of the data storage device 10. For example, the controller 100 may store data in the nonvolatile memory devices 200 in response to a write command received from the external device. Also as an example, the controller 100 may read data stored in the nonvolatile memory devices 200 and output the read data to the external device, in response to a read command received from the external device.

The controller 100 may include a command processing unit 105. The command processing unit 105 may receive a command CMD from the external device, and control the nonvolatile memory devices 200 by executing the command CMD for the nonvolatile memory devices 200.

The command processing unit 105 may include a command manager 150, a first queue 110, a plurality of second queues 120, and a plurality of execution units 130.

The command manager 150 may manage the command CMD in the first queue 110 based on a first attribute of the command CMD and queue information of the first queue 110. For example, the command manager 150 may manage the command CMD by removing the command CMD from the first queue 110 based on the first attribute and the queue information and inputting the command CMD to a second queue selected from the second queues 120 based on an address information of the command CMD.

For example, the first attribute may be an attribute which is given to the command CMD according to the order of priority by the external device. For example, the first attribute may include "simple", "ordered" and "head" attributes, but according to the embodiment, the first attribute is not limited to the foregoing attributes.

In an embodiment, the first attribute is classified into a first type and a second type, wherein the first type may include, for example, the head attribute and the ordered attribute, whereas the second type may include, for example, a simple attribute. A command of which the first attribute is of the first type may be processed to correspond to an order of priority set by the external device. A command of which the first attribute is of the second type may be essentially processed in an out-of-order execution without being limited by the order.

When inputting the command CMD to the first queue 110 the command manager 150 determines an order for the received command CMD among the commands stored in the first queue 110, based on the first attribute of the received command CMD and the first attributes of those commands that are the time stored in the first queue 110. That is, the command manager 150 may perform ordering of the commands based on the first attributes of the commands stored in the first queue 110. In detail, the command manager 150 may give the earliest turn to a command CMD having the head attribute. The command manager 150 may give a turn to a command CMD having the ordered attribute which is later than a command having a head attribute but earlier than a command having a simple attribute. The command manager 150 may give the latest turn to a command CMD having a simple attribute. The command manager 150 may give a turn later than the command currently stored in the first queue 110, to a command CMD having the same attribute as that of the command currently stored in the first queue 110.

The command manager 150 may manage, among the commands currently stored in the first queue 110, the number (hereinafter, referred to as a standby count CNT) of commands that have a first attribute which is of the first type, as queue information of the first queue 110. That is, the standby count CNT may indicate, among the commands currently stored in the first queue 110, the number of commands having the head attributes and the ordered attributes.

The command manager 150 may set a second attribute of the command CMD, based on the first attribute of the command CMD and the standby count CNT immediately before the command CMD is stored in the first queue 110. The second attribute of the command CMD may include a reordered attribute or an out-of-order attribute. The command manager 150 may set the second attribute AT2 of the command CMD to the reordered attribute when the first attribute AT1 is of the first type or the standby count CNT is greater than 0. The command manager 150 may set the second attribute AT2 to the out-of-order attribute when the first attribute AT1 is of the second type and the standby count CNT is 0.

The command manager 150 removes the command CMD from the first queue 110 according to the command order in the first queue 110 based on the second attribute of the command CMD, or remove the command CMD from the first queue 110 regardless of the order, and then input the removed command CMD to a second queue selected from the second queues 120. For example, when the second attribute AT2 of the command CMD is a reordered attribute, the command manager 150 may prohibit removal of the command CMD from the first queue 110 until a command having a turn that is earlier than the command CMD is removed from the first queue 110. When the second attribute AT2 of the command CMD is an out-of-order attribute, the command manager 150 removes the command CMD from the first queue 110 regardless of the turn of the command CMD in the first queue 110.

In an embodiment, the command manager 150 may transmit, through setting the second attribute based on the first attribute of the command CMD and the standby count CNT (i.e., through reordering), a low priority command inputted when a high priority command is present in the first queue 110, to the second queues 120 later than the high priority command. As a result, this may induce that the command is executed, according to the order of priority given to the command CMD by the external device.

For the command CMD that is essentially limited by the order of priority (i.e., the command CMD having a simple attribute), despite the fact that the corresponding nonvolatile memory device is not in a busy state, waiting until another command of an earlier turn corresponding to another nonvolatile memory device is removed from the first queue 110 may delay the operation. To prevent this, the command manager 150 may transmit, through reordering, the command CMD having the simple attribute which was inputted when a high priority command wasn't present in the first queue 110, to the second queues 120 regardless of the order in the first queue 110. Consequentially, the command manager 150 may contribute to restraining delay of the processing and enhancing the operation performance.

According to an embodiment, a command reordered by the command manager 150 may be limited to the read command. The write command may be processed without the first attribute being particularly given by the external device and may be processed without the second attribute being given by the command manager 150. For example, the write command may be processed as an out-of-order attribute. In another example, the write command may be processed according to a received order.

According to an embodiment, the command manager 150 may store, along with the command CMD, the second attribute of the command CMD in the first queue 110, or manage the second attribute separately from the command CMD.

According to an embodiment, the command manager 150 may process, based on the current standby count CNT, commands currently stored in the first queue 110, regardless of the second attributes of the commands as if the commands have out-of-order attributes. For example, when the current standby count CNT is not "0", the command manager 150 may manage the command CMD according to the second attribute of the command CMD, as described above. When the current standby count CNT is "0", even if the second attribute of the command CMD is a reordered attribute, the command manager 150 may manage the command CMD as if it has an out-of-order attribute. For this, for example, the command manager 150 may reset, when the current standby count CNT is "0", the second attributes of the commands stored in the first queue 110 to out-of-order attributes.

The first queue 110 may store received commands.

The second queues 120 may store commands removed from the first queue 110. The second queues 120 may include a plurality of queues 121-124.

In the illustrated example the execution units 130 include four execution units 131-134. Each of the execution units 130 corresponds to respective second queues 121-124 and also to respective nonvolatile memory devices 201-204. Each of the execution units 130 may execute a command stored in a corresponding second queue, for a corresponding nonvolatile memory device. For example, the execution unit 131 may successively execute commands stored in the second queues 121, for the nonvolatile memory devices 201.

The nonvolatile memory devices 200 may store data transmitted from the controller 100 and may read stored data and transmit read data to the controller 100, according to control of the controller 100.

Each of the nonvolatile memory devices 200 may be or include one of a flash memory, such as a NAND flash or a NOR flash, a Ferroelectrics Random Access Memory (FeRAM), a Phase-Change Random Access Memory (PCRAM), a Magnetoresistive Random Access Memory (MRAM), Resistive Random Access Memory (ReRAM), and the like.

Figure 2:
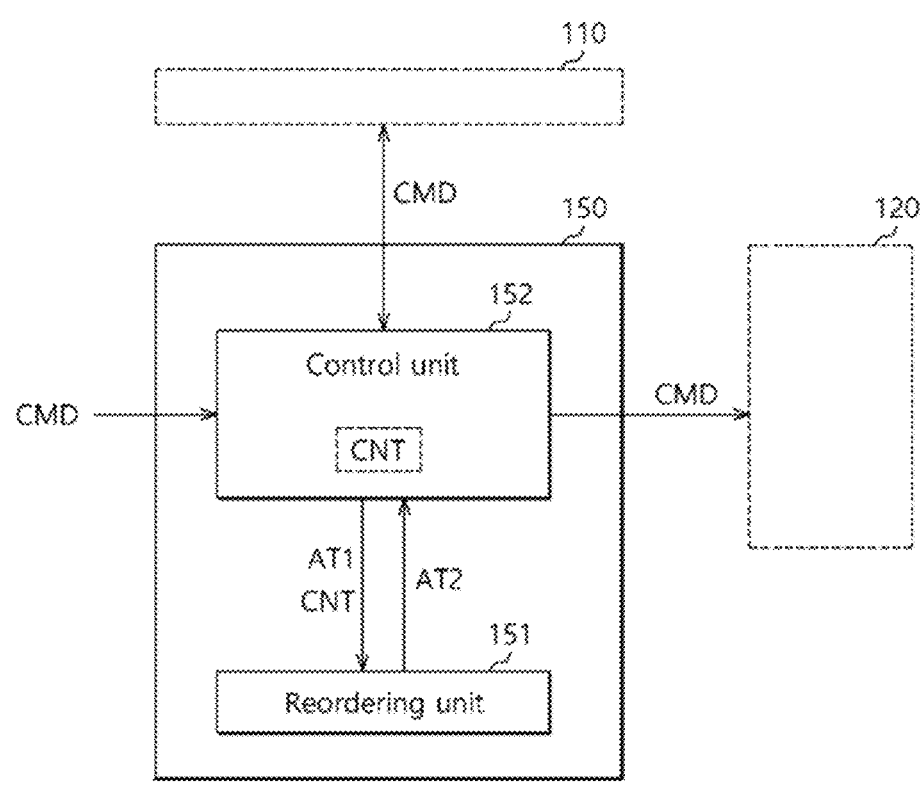
FIG. 2 is a block diagram illustrating a configuration for the command manager of FIG. 1, according to an embodiment of the present invention.

FIG. 2 is a block diagram illustrating an, example configuration for the command manager 150 of FIG. 1.

Referring to FIG. 2, the command manager 150 may include a reordering unit 151 and a control unit 152.

The reordering unit 151 may set, when the command CMD is received at the command manager 150, the second attribute AT2 of the command CMD, based on the first attribute AT1 of the command CMD and the standby count CNT immediately before the command CMD is stored in the first queue 110. The reordering unit 151 may receive the first attribute AT1 and the standby count CNT from the control unit 152, set the second attribute AT2, and transmit it to the control unit 152. For example, the reordering unit 151 may set the second attribute AT2 to the reordered attribute when the first attribute AT1 is of the first type or the standby count CNT is greater than 0. The reordering unit 151 may set the second attribute AT2 to the out-of-order attribute when the first attribute AT1 is of the second type and the standby count CNT is 0.

The control unit 152 may manage the standby count CNT. That is, among the commands currently stored in the first queue 110, the control unit 152 may manage the number of commands for which the first attribute AT1 is of the first type (i.e., the head attribute or the ordered attribute). The control unit 152 may increase the standby counter CNT, if the first attribute AT1 of the command CMD is of the first type when the command CMD is inputted to the first queue 110. The control unit 152 may reduce the standby counter CNT, if the first attribute AT1 of the command CMD is of the first type when the command CMD is removed from the first queue 110.

The control unit 152 inputs the command CMD to the first queue 110, remove the command CMD from the first queue 110 based on the second attribute AT2 of the command CMD, and transmit the removed command CMD to the second queues 120. When inputting the command CMD to the first queue 110, the control unit 152 determines, based on the first attribute of the command CMD and first attributes of commands currently stored in the first queue 110, the turn of the command CMD in the commands stored in the first queue 110. The control unit 152 may prohibit, when the second attribute AT2 of the newly inputted command CMD is a reordered attribute, removal of the newly inputted command CMD from the first queue 110 until a command having a turn that is earlier than the newly inputted command CMD is removed from the first queue 110. Further, when the second attribute AT2 of the newly inputted command CMD is an out-of-order attribute, the control unit 152 removes, the newly inputted command CMD from the first queue 110 regardless of the turn of the command CMD in the first queue 110.

Figure 3:
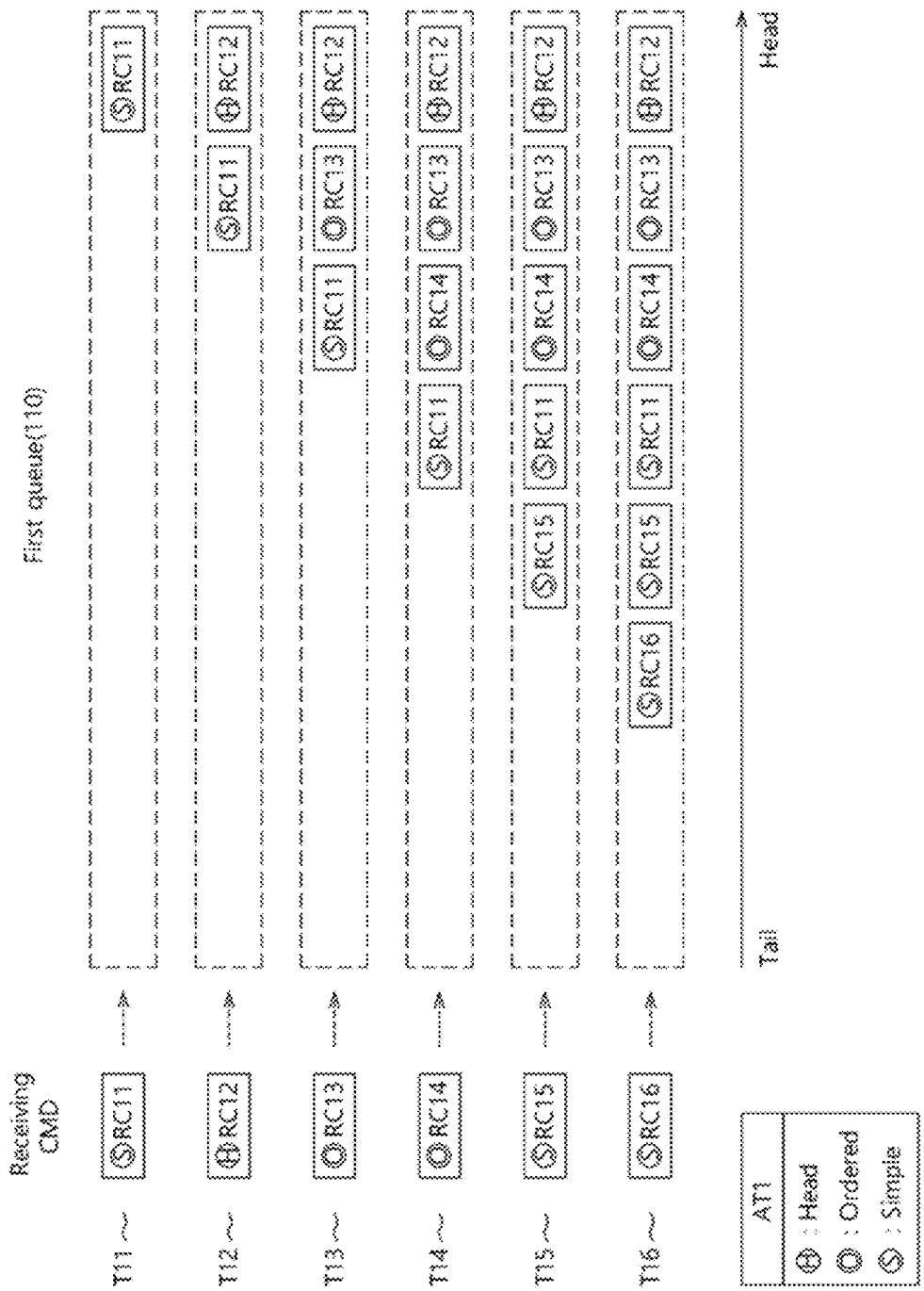
FIG. 3 is a diagram illustrating a method by which a control unit of the command manager of FIG. 2 inputs a received command to a first queue based on a first attribute of the command, according to an embodiment of the present invention.

FIG. 3 is a diagram illustrating a method by which the control unit 152 of FIG. 2 inputs, based on the first attribute AT1 of the newly inputted command CMD, the command CMD to the first queue 110. In FIG. 3, commands may be inputted to the first queue 110 according to a given order based on the first attributes AT1. For the sake of convenient description, a case where the newly inputted command CMD has a second attribute AT2 and is, thus, removed from the first queue 110 (according to the second attribute) is not illustrated in FIG. 3.

Hereinafter, a method of ordering a newly inputted command CMD, by the control unit 152, will be described in detail with reference to FIGS. 1 to 3.

Referring to FIG. 3, the control unit 152 determines, based on the first attribute AT1 of the received command CMD and first attributes AT1 of commands currently stored in the first queue 110, the turn of the command CMD received at the first queue 110 and input the command CMD to the first queue 110, as follows.

At timing T11, a read command RC11 of which a first attribute AT1 is a simple attribute may be received. The control unit 152 inputs the read command RC11 to the first queue 110.

At timing T12, a read command RC12 of which a first attribute AT1 is a head attribute may be received. The control unit 152 inputs the read command RC12 to the first queue 110 in a turn earlier than the read command RC11.

At timing T13, a read command RC13 of which a first attribute AT1 is an ordered attribute may be received. The control unit 152 inputs the read command RC13 to the first queue 110 in a turn that is earlier than the read command RC11 and later than the read command RC12.

At timing T14, a read command RC14 of which a first attribute AT1 is an ordered attribute may be received. The control unit 152 inputs the read command RC14 to the first queue 110 in a turn that is earlier than the read command RC11 and later than the read command RC13.

At timing T15, a read command RC15 of which a first attribute AT1 is a simple attribute may be received. The control unit 152 inputs the read command RC15 to the first queue 110 in a turn later than the read command RC11.

At timing T16, a read command RC16 of which a first attribute AT1 is a simple attribute may be received. The control unit 152 inputs the read command RC16 to the first queue 110 in a turn later than the read command RC15.

Figure 4:
FIG. 4 is a table showing a method by which a reordering unit of the command manager of FIG. 2 sets a second attribute of the command, according to an embodiment of the present invention.

FIG. 4 is a table TBL illustrating a method by which the reordering unit 151 of FIG. 2 sets the second attribute AT2 of the command CMD.

Referring to FIG. 4 the reordering unit 151 may set, when the command CMD is received at the command manager 150, the second attribute AT2 of the command CMD based on the first attribute AT1 of the command CMD and the current standby count CNT.

First, the reordering unit 151 may classify the first attribute AT1 of the command CMD into a first type or a second type attribute. A first type attribute may be or include at least one of a head attribute and an ordered attribute, whereas the second type may include a simple attribute.

The reordering unit 151 may set, when the first attribute AT1 of the command CMD is of the first type, the second attribute AT2 of the command CMD to the reordered attribute regardless of the current standby count CNT. If the current standby count CNT is "0" when the first attribute AT1 of the command CMD is of the second type, the reordering unit 151 may set the second attribute AT2 of the command CMD to the out-of-order attribute. If the current standby count CNT is not "0", that is, greater than "0", when the first attribute AT1 of the command CMD is of the second type, the reordering unit 151 may set the second attribute AT2 of the command CMD to the reordered attribute.

Consequentially, in an embodiment, if the current standby count CNT is greater than "0", the second attribute AT2 of the command CMD may be set to the reordered attribute regardless of the first attribute AT1. If the current standby count CNT is "0", the second attribute AT2 of the command CMD of which the first attribute AT1 is of the first type may be set to the reordered attribute, and the second attribute AT2 of the command CMD of which the first attribute AT1 is of the second type may be set to the out-of-order attribute.

Figure 5:
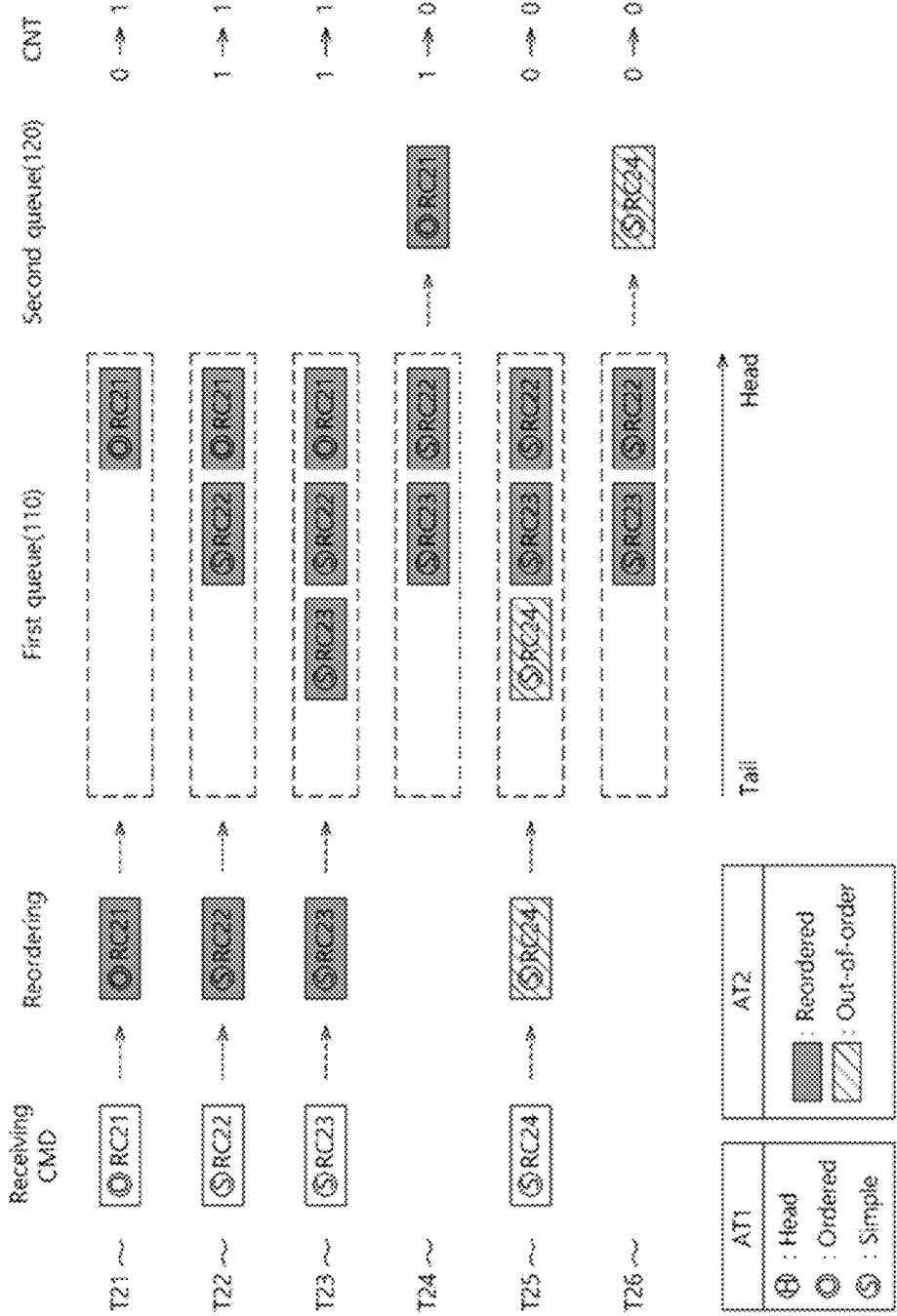
FIG. 5 is a diagram illustrating a method by which the command manager of FIG. 1 sets the second attribute of the command and removes the command from the first queue based on the second attribute, according to an embodiment of the present invention.

FIG. 5 illustrates a method by which the command manager 150 of FIG. 1 sets the second attribute AT2 of the command CMD and removes the command CMD from the first queue 110 based on the second attribute AT2.

Hereinafter, an operating method of the command manager 150 will be described in detail with reference to FIGS. 1, 2, 4 and 5, At timing T21, a read command RC21 of which a first attribute AT1 is an ordered attribute may be received. Because the first attribute AT1 of the read command RC21 is of the first type, the reordering unit 151 sets a second attribute AT2 of the read command RC21 to a reordered attribute. The control unit 152 then inputs the read command RC21 to the first queue 110. Also, because the first attribute AT1 of the read command RC21 is of the first type, the control unit 152 increases the standby count CNT to "1".

At timing T22, a read command RC22 of which a first attribute AT1 is a simple attribute may be received. Because the current standby count CNT is "1", the reordering unit 151 sets a second attribute AT2 of the read command RC22 to the reordered attribute. The control unit 152 then inputs the read command RC22 to the first queue 110 in a turn later than the read command RC21. The read command RC22 is not removed from the first queue 110 until the read command RC21 of an earlier turn is removed from the first queue 110. Therefore, the order of priority given to the read command RC21 by the external device is secured. Also, because the first attribute AT1 of the read command RC22 is of the second type, the control unit 152 maintains the standby count CNT at "1".

At timing T23, a read command RC23 of which a first attribute AT1 is a simple attribute may be received. Because the current standby count CNT is "1", the reordering unit 151 sets a second attribute AT2 of the read command RC23 to the reordered attribute. The control unit 152 inputs the read command RC23 to the first queue 110 in a turn later than the read command RC22. The read command RC23 is not removed from the first queue 110 until the read commands RC21 and RC22 of earlier turns are removed from the first queue 110. Also, because the first attribute AT1 of the read command RC23 is of the second type, the control unit 152 maintains the standby count CNT at "1".

At timing T24, the control unit 152 removes the read command RC21 from the first queue 110 and inputs the removed read command RC21 to any one of the second queues 120. The second queue to which the read command RC21 is to be inputted may be selected according to address information of the read command RC21. Although, for example, the control unit 152 may process the read command RC21 when the second queue to which the read command RC21 is to be inputted is capable of receiving the read command RC21, the embodiment is not limited to this. Because the read command RC21 of which the first attribute AT1 is of the first type has been removed from the first queue 110, the control unit 152 reduces the standby count CNT to "0".

At timing T25, a read command RC24 of which a first attribute AT1 is a simple attribute may be received. Because the current standby count CNT is "0", the reordering unit 151 sets a second attribute AT2 of the read command RC24 to the out-of-order attribute. The control unit 152 inputs the read command RC24 to the first queue 110 in a turn later than the read command RC23. Also, because the first attribute AT1 of the read command RC24 is of the second type, the control unit 152 maintains the standby count CNT at "0".

At timing T26, the control unit 152 removes the read command RC24 having the out-of-order attribute from the first queue 110 earlier than the other commands RC22 and RC23 of earlier turns. The read command RC24 may be removed from the first queue 110 and inputted to any one of the second queues 120 according to address information. For example, if a nonvolatile memory device corresponding to the read command RC24 is not in a busy state while nonvolatile memory devices corresponding to the commands RC22 and RC23 are in a busy state, as described above, inputting the read command RC24 to the second queues 120 earlier than the other commands RC22 and RC23 may consequentially contribute to enhancing the operation performance.

Figure 6:
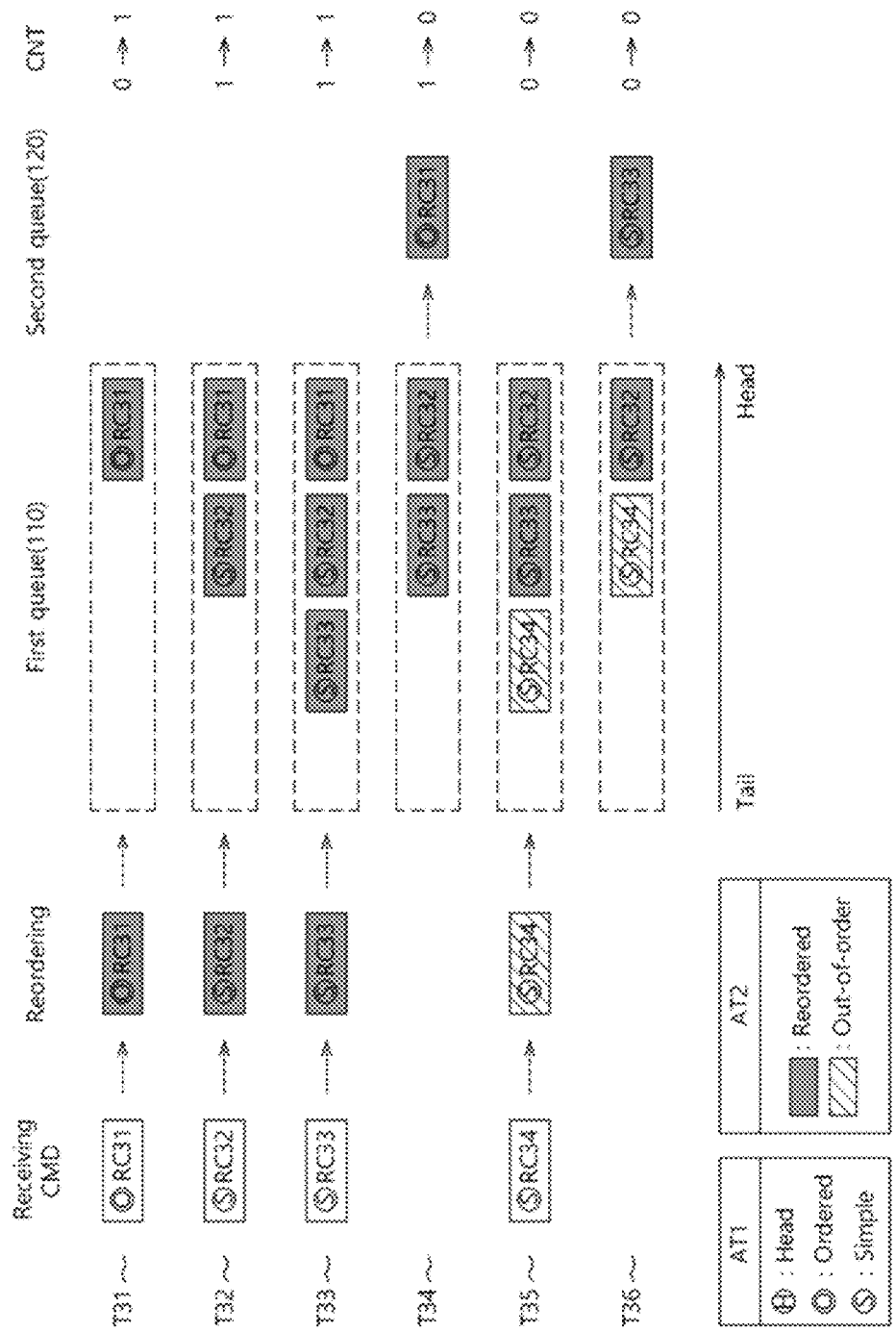
FIG. 6 is a diagram illustrating a method by which the command manager of FIG. 1 sets the second attribute of the command and processes the command based on the second attribute and a standby count, according to an embodiment of the present invention.

FIG. 6 illustrates a method by which the command manager 150 of FIG. 1 sets the second attribute AT2 of the command CMD and processes the command CMD based on the second attribute AT2 and the standby count CNT.

According to an embodiment, when the current standby count CNT is not "0" as described with reference to FIG. 5, the command manager 150 may manage the command CMD according to the second attribute AT2 of the command CMD. When the current standby count CNT is "0", even if the second attribute AT2 of the command CMD is a reordered attribute, the command manager 150 may manage the command CMD as if it has an out-of-order attribute.

Referring to FIG. 6, the operations of the command manager 150 at timings T31 to T35 are substantially the same as the operations of the command manager 150 at timings T21 to T25 described with reference to FIG. 5. Therefore, detailed description will be omitted.

At timing T36, the control unit 152 removes a read command RC33 from the first queue 110 and input the removed read command RC33 to any one of the second queues 120. The second queue to which the read command RC33 is inputted may be selected according to address information of the read command RC33. That is, although a second attribute AT2 of the read command RC33 is a reordered attribute, the read command RC33 may be removed from the first queue 110 earlier than a read command RC32 of an earlier turn because the current standby count CNT is "0". For example, if a nonvolatile memory device corresponding to the read command RC33 is not in a busy state while nonvolatile memory devices corresponding to the commands RC32 and RC34 are in a busy state, as described above inputting the read command RC33 to the second queues 120 earlier than the other commands RC32 and RC34 may contribute to enhancing the operation performance.

At timing T36, the read command RC34 of which a second attribute AT2 is an out-of-order attribute may be removed from the first queue 110 earlier than the commands RC32 and RC33 of earlier turns, of course.

Figure 7:
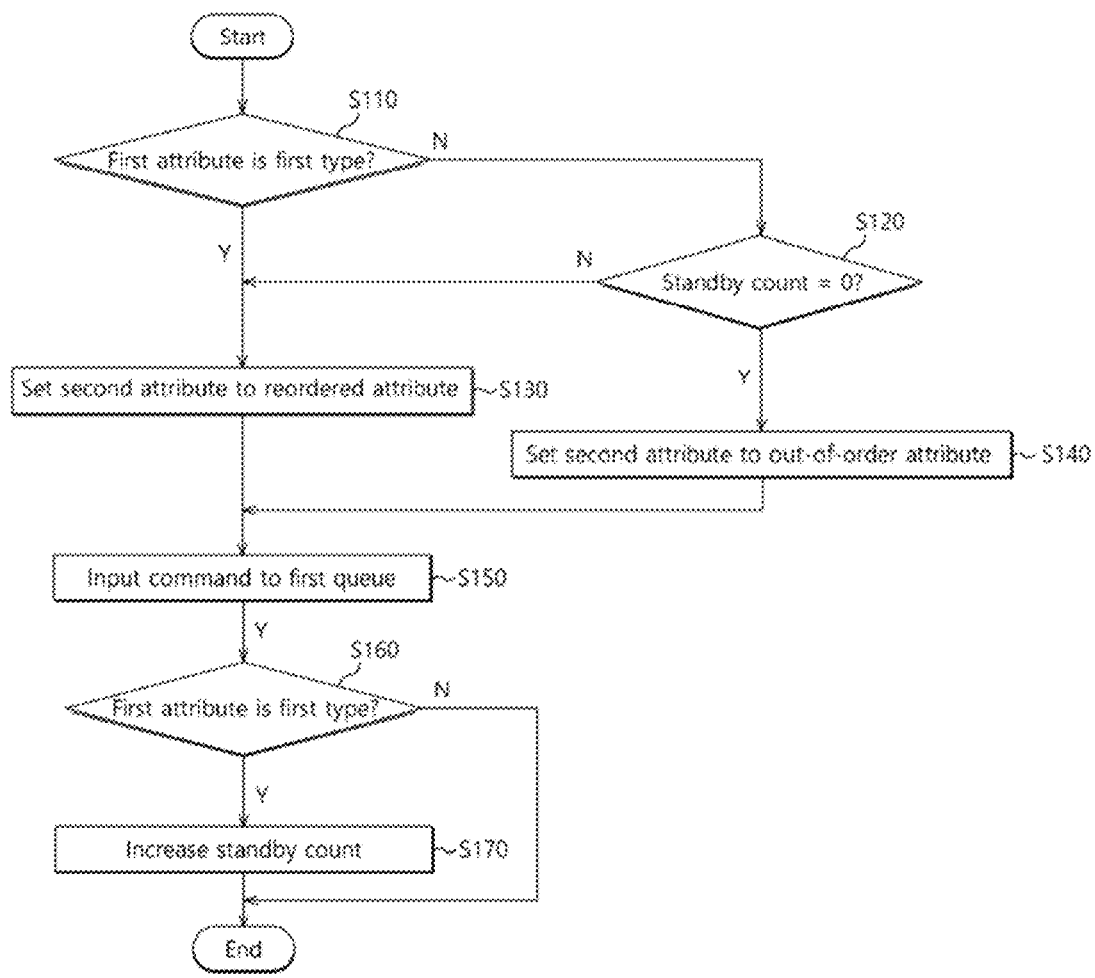
FIG. 7 is a flowchart of an operating method of the data storage device of FIG. 1, according to an embodiment of the present invention.

FIG. 7 is a flowchart illustrating an example of the operating method of the data storage device 10 of FIG. 1. In FIG. 7, the command manager 150 may set, based on a first attribute AT1 of a received command CMD and a standby count CNT, a second attribute AT2 and input the command CMD to the first queue 110.

Hereinafter, the operating method of the data storage device 10 will be described in detail with reference to FIGS. 1, 2, 4 and 7.

At step S110 the reordering unit 151 of the command manager 150 determines whether the first attribute AT1 of the command CMD is of the first type. When the first attribute AT1 is not of the first type, that is, when the first attribute AT1 is of the second type, the process moves to step S120. When the first attribute AT1 is of the first type, the process moves to step S130.

At step S120, the reordering unit 151 determines whether the standby count CNT is "0" immediately before the command CMD is stored in the first queue 110. When the standby count CNT is not "0", that is, when it is greater than "0", the process moves to step S130. When the standby count CNT is "0", the process moves to step S140.

At step S130, the reordering unit 151 sets the second attribute AT2 of the command CMD to the reordered attribute.

At step S140, the reordering unit 151 sets the second attribute AT2 of the command CMD to the out-of-order attribute.

At step S150, the control unit 152 inputs the command CMD to the first queue 110. The control unit 152 determines, based on the first attribute AT1 of the received command CMD and first attributes AT1 of commands currently stored in the first queue 110, the turn of the command CMD in the first queue 110 and input the command CMD to the first queue 110.

At step S160, the control unit 152 determines whether the first attribute AT1 of the command CMD is of the first type. When the first attribute AT1 is of the first type, the process moves to step S170. When the first attribute AT1 is not the first type, that is, when the first attribute AT1 is of the second type, the process may end.

At step S170, the control unit 152 increases the standby count CNT.

Figure 8:
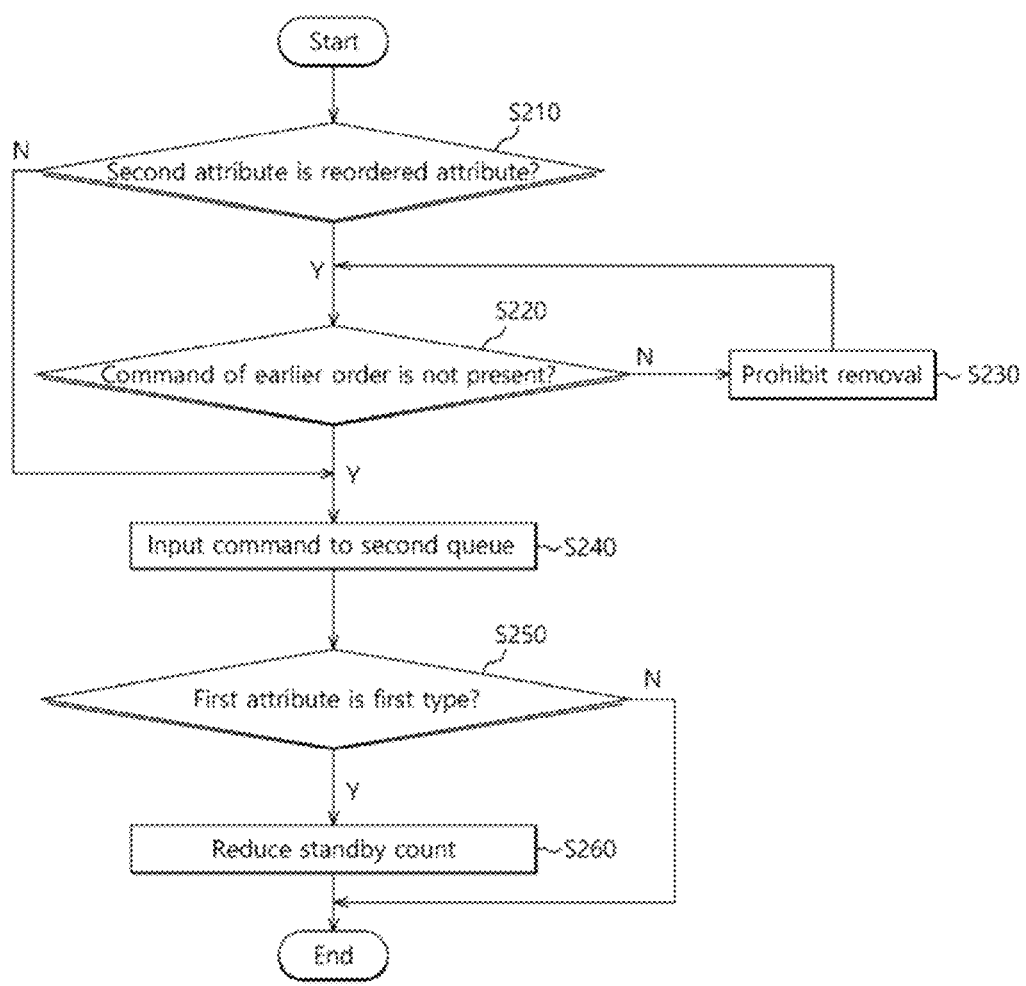
FIG. 8 is a flowchart of an operating method of the data storage device of FIG. 1, according to another embodiment of the present invention.

FIG. 8 is a flowchart illustrating another example of the operating method of the data storage device 10 of FIG. 1. In FIG. 8, the command manager 150 removes, from the first queue 110, the command CMD stored in the first queue 110, based on the second attribute AT2 of the command CMD and the turn of the command CMD in the first queue 110.

Hereinafter, the operating method of the data storage device 10 will be described in detail with reference to FIGS. 1, 2 and 8.

At step S210, the control unit 152 determines whether the second attribute AT2 of the command CMD stored in the first queue 110 is the reordered attribute. When the second attribute AT2 is the reordered attribute, the process moves to step S220. When the second attribute AT1 is not the reordered attribute, that is, when it is the out-of-order attribute, the process moves to step S240.

At step S220, the control unit 152 determines whether a command having a turn that is earlier than the turn of the command CMD is not present in the first queue 110. When a command of an earlier turn than the turn of the command CMD is present, the process moves to step S230. When a command of an earlier turn than the turn of the command CMD is not present, the process moves to step S240.

At step S230, the control unit 152 prohibits removal of the command CMD from the first queue 110. Then, the process moves to step S220. That is, as long as a command having a turn that is earlier than the turn of the received command CMD is not present in the first queue 110, the control unit 152 may prohibit removal of the received command CMD from the first queue 110.

At step S240, the control unit 152 removes the command CMD from the first queue 110 and inputs the removed command CMD to any one of the second queues 120. The control unit 152 may select any one of the second queues 120 according to address information of the command CMD.

At step S250, the control unit 152 determines whether the first attribute AT1 of the command CMD is of the first type. When the first attribute AT1 is of the first type, the process moves to step S260. When the first attribute AT1 is not of the first type, that is, when the first attribute AT1 is of the second type, the process may end.

At step S260, the control unit 152 reduces the standby count CNT

Figure 9:
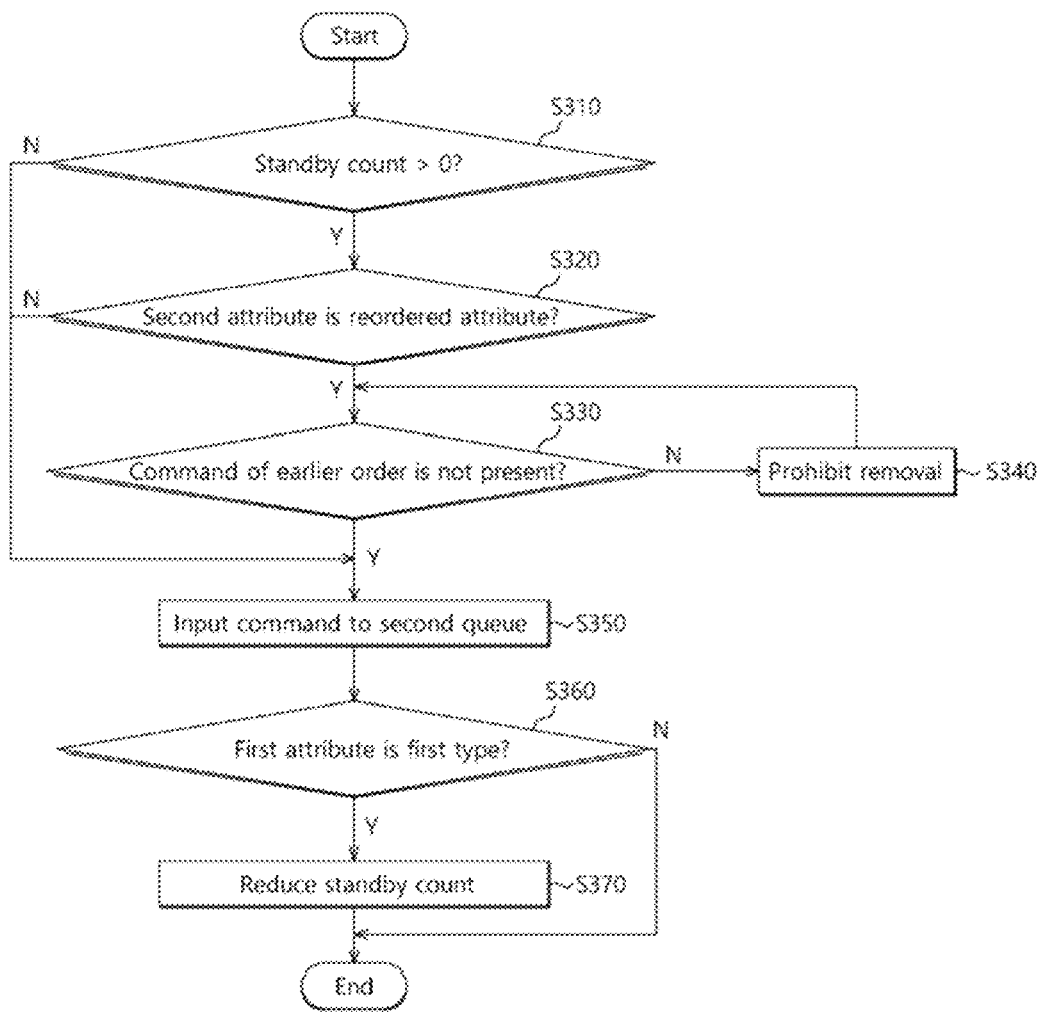
FIG. 9 is a flowchart of an operating method of data storage device of FIG. 1, according to yet another embodiment of the present invention.

FIG. 9 is a flowchart illustrating still another example of the operating method of the data storage device 10 of FIG. 1. In FIG. 9, the command manager 150 may process the command CMD stored in the first queue 110, based on the current standby count CNT of the command CMD, the second attribute AT2 thereof and the turn thereof in the first queue 110. That is, compared to FIG. 8, the command manager 150 removes, when the current standby count CNT is "0", the command CMD from the first queue 110, regardless of the second attribute T2 of the command CMD, as if the command CMD has an out-of-order attribute.

Hereinafter, the operating method of the command manager 150 will be described in detail with reference to FIGS. 1, 2 and 9.

At step S310, the control unit 152 determines whether the current standby count CNT is greater than "0". When the current standby count CNT is greater than "0", the process moves to step S320. When the current standby count CNT is "0", the process moves to step S350.

Steps S320 to S370 may be performed in substantially the same manner as step S210 to S260 of FIG. 8. Therefore, detailed description will be omitted.

Figure 10:
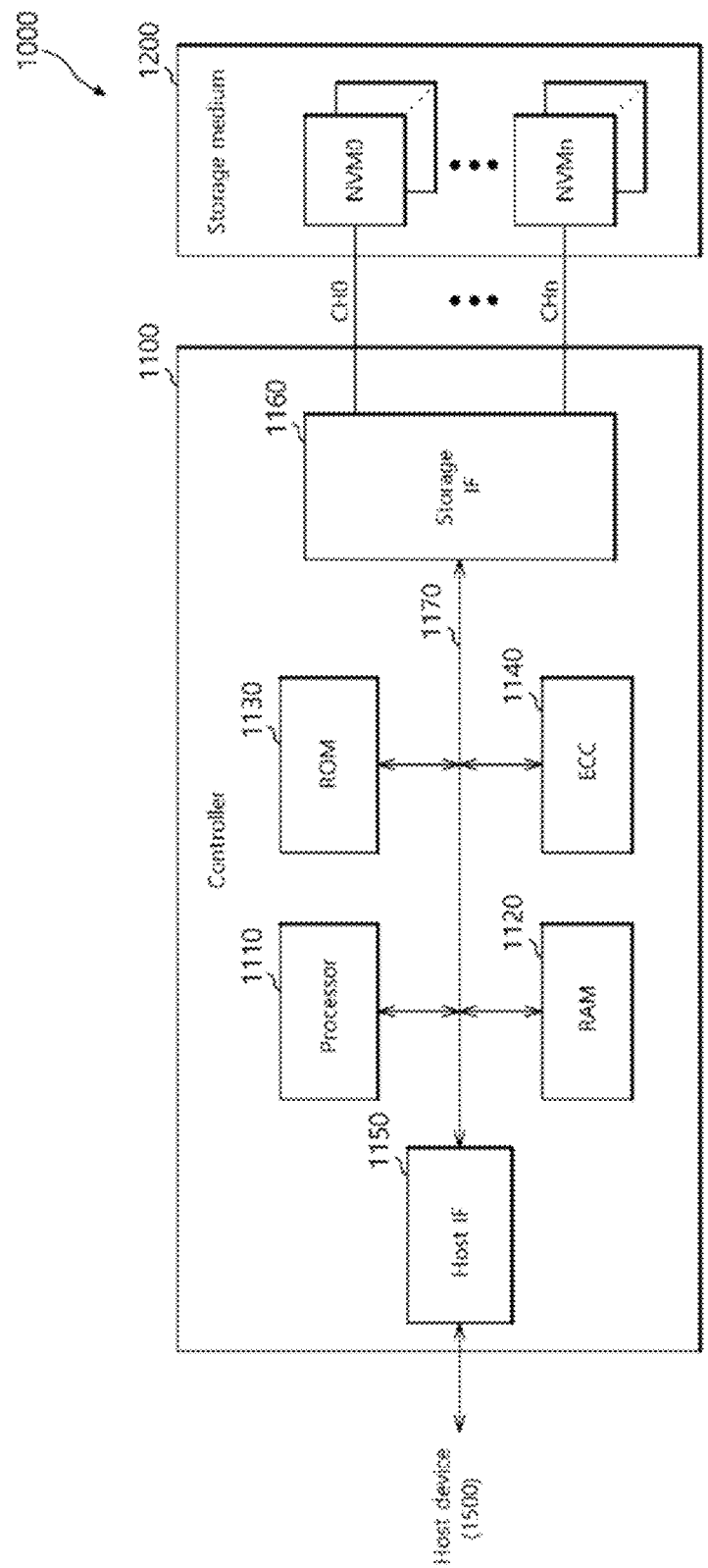
FIG. 10 is a block diagram illustrating a solid stat drive (SSD) according to an embodiment of the present invention

FIG. 10 illustrates a solid stat drive (SSD) 1000, according to an embodiment of the present invention.

Referring to FIG. 10, the SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface 1150, and a storage medium interface 1160.

The processor 1110 may control the operations of the controller 1100. The processor 1110 may store data in the storage medium 1200 and read stored data from the storage medium 1200, according to data processing requests from the host device 1500. In order to of manage the storage medium 1200, the processor 1110 may control the internal operations of the SSD 1000, such as, for example, a merge operation, a wear leveling operation, and so forth.

The processor 1110 may include the command processing unit 105 of FIG. 1.

The RAM 1120 may store programs and program data to be used by the processor 1110, The RAM 1120 may temporarily store data received from the host interface 1150 before transferring them to the storage medium 1200, and may temporarily store data received from the storage medium 1200 before transferring them to the host device 1500.

The ROM 1130 may store program codes to be read by the processor 1110. The program codes may include commands to be processed by the processor 1110 for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm, The host interface 1150 may exchange data processing requests, data, etc. with the host device 1500.

The storage medium interface 1160 may transmit control signals and data to the storage medium 1200. The storage medium interface 1160 may receive data from the storage medium 1200. The storage medium interface 1160 may be coupled with the storage medium 1200 through a plurality of channels CH0 to CHn.

The storage medium 1200 may include plurality of nonvolatile memory devices NVM0 to NVMn. Each of the plurality of nonvolatile memory devices NVM0 to NVMn may perform a write operation and a read operation according to the control of the controller 1100.

Figure 11:
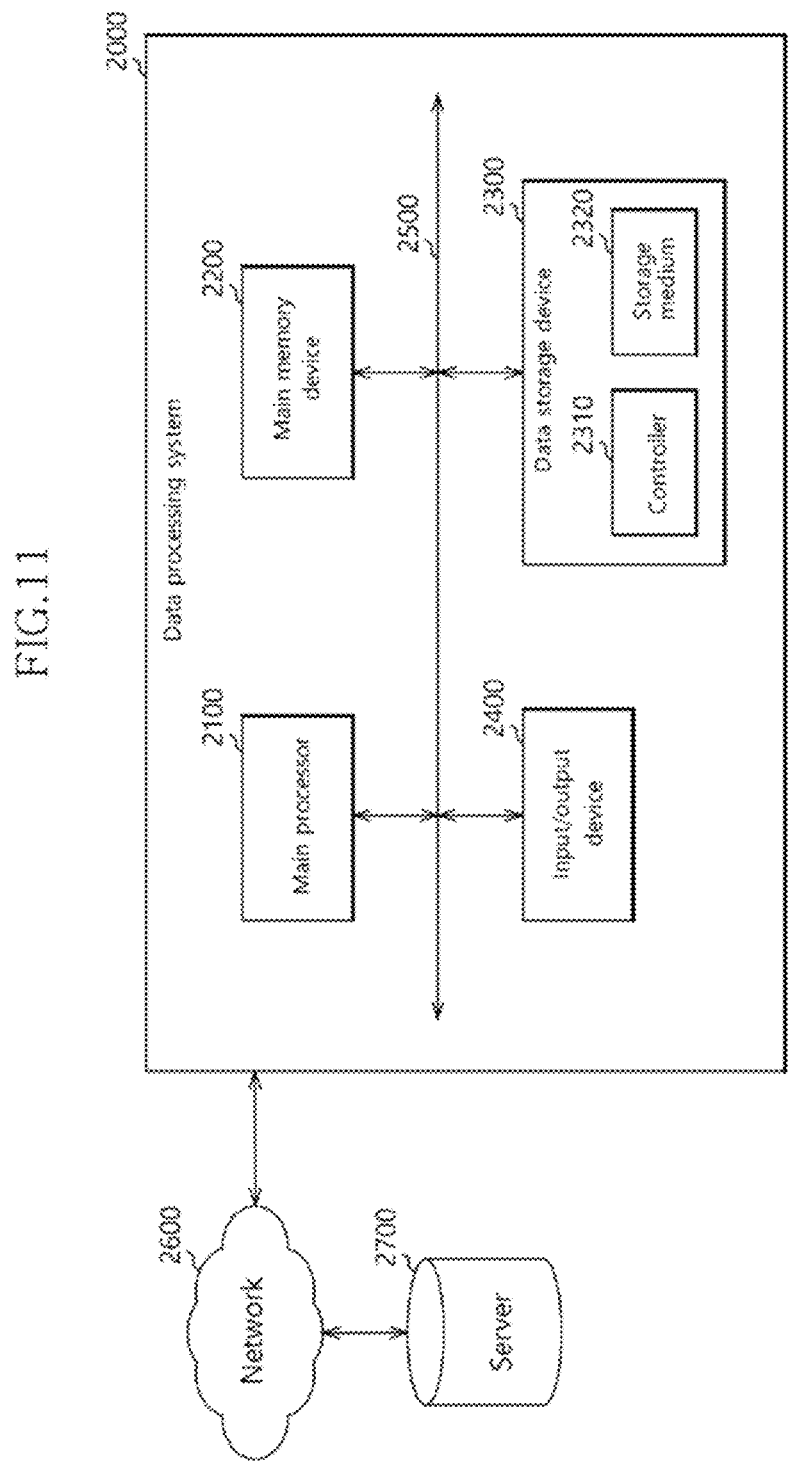
FIG. 11 is a block diagram illustrating a data processing system including a data storage device, according to an embodiment of the present invention.

FIG. 11 is a block diagram illustrating a data processing system 2000, according to an embodiment of the invention.

The data processing system 2000 may be or include a computer, a laptop, a netbook, a smart phone, a digital television (TV), a digital camera, a navigator, and the like. The data processing system 2000 may include a main processor 2100, a main memory device 2200, a data storage device 2300, and an input/output device 2400. The internal units of the data processing system 2000 may exchange data, control signals, and the like through a system bus 2500.

The main processor 2100 may control the operations of the data processing system 2000. For example, the main processor 2100 may be a central processing unit such as a microprocessor. The main processor 2100 may execute the software of an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate in a manner substantially similar to the data storage device 10 shown in FIG. 1.

The input/output device 2400 may be or include at least one of a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

It is also noted, that in some instances, as would be apparent to those skilled in the relevant art, a feature or element described in connection with one embodiment may be used singly or in combination with other features or elements of another embodiment, unless otherwise specifically indicated.

While various embodiments have been described above, it will be understood to those skilled in the art that the embodiments described are examples only. Accordingly, the data storage device and the operating method thereof described herein should not be limited based on the described embodiments. Many other embodiments and or variations thereof may be envisaged by those skilled in the relevant art without departing from the spirit and or scope of the present invention as defined in the following claims.

What is claimed is:

1. A data storage device comprising:
a plurality of nonvolatile memory devices;
a first queue suitable for storing commands received from host device;
a plurality of second queues suitable for storing commands moved from the first queue; and
a command manager suitable for storing a first command received from the host device in the first queue, determines a second attribute of the first command based on a first attribute of the first command and queue information of the first queue, and moves the first command to one of the second queues to be executed, based on the second attribute,
wherein the queue information is a number determined based on first attribute of each of commands stored in the first queue.

2. The data storage device according to claim 1,
wherein the plurality of second queues respectively correspond to the plurality of nonvolatile memory devices, and
wherein the command manager manages the first command by removing the first command from the first queue, based on the first attribute of the first command and the queue information, and inputting the first command to any one second queue selected from the plurality of second queues, based on address information of the first command.

3. The data storage device according to claim 2, further comprising:
- a plurality of execution units, which respectively correspond to the plurality of second queues, and which respectively correspond to the plurality of nonvolatile memory devices,
- wherein each of the plurality of execution units executes a command stored in a corresponding second queue, for a corresponding nonvolatile memory device.

4. The data storage device according to claim 1, wherein the command manager determines a turn of the first command in commands stored in the first queue, based on the first attribute of the first command and first attributes of the commands stored in the first queue.

5. The data storage device according to claim 1, wherein the command manager comprises:
- a reordering unit suitable for setting the second attribute of the first command, based on the first attribute of the first command and the queue information, immediately before the first command is stored in the first queue; and
- a control unit suitable for inputting the first command to the first queue, and removing the first command from the first queue based on the second attribute.

6. The data storage device according to claim 5, wherein the control unit manages a count as the queue information, the count being, among the commands stored in the first queue, a number of commands each of which the first attribute is a first type.

7. The data storage device according to claim 6, wherein the reordering unit sets the second attribute to a reordered attribute when the first attribute of the first command is of the first type or the count is greater than 0, and sets the second attribute to an out-of-order attribute when the first attribute of the first command is a second type and the count is 0.

8. The data storage device according to claim 5, wherein the control unit prohibits, when the second attribute is a reordered attribute, removal of the first command from the first queue until a command having a turn that is earlier than the first command is removed from the first queue.

9. The data storage device according to claim 5, wherein the control unit removes, when the second attribute is an out-of-ordered attribute, the first command from the first queue regardless of a turn of the first command in the first queue.

10. The data storage device according to claim 5, wherein the control unit removes, based on the queue information, the first command from the first queue regardless of the second attribute.

11. An operating method of a data storage device, comprising:
- receiving a first command;
- storing the first command in a first queue;
- determining a second attribute of the first command based on a first attribute of the first command and queue information of the first queue; and
- moving the first command to one of second queues to be executed, based on the second attribute,
- wherein the queue information is a number determined based on first attribute of each of commands stored in the first queue.

12. The operating method according to claim 11, wherein the managing of the first command comprises:
- removing the first command from the first queue, based on the first attribute and the queue information; and
- inputting the first command to any one selected from the second queues, based on address information of the first command.

13. The operating method according to claim 12, further comprising:
- executing, in parallel, commands stored in the second queues, for a plurality of nonvolatile memory devices that respectively correspond to the second queues.

14. The operating method according to claim 11, wherein the managing of the first command comprises determining a turn of the first command in the commands stored in the first queue, based on the first attribute and first attributes of the commands stored in the first queue.

15. The operating method according to claim 11, wherein the managing of the first command comprises:
- setting the second attribute of the first command, based on the first attribute of the first command and queue information immediately before the first command is stored in the first queue; and
- removing the first command from the first queue based on the second attribute.

16. The operating method according to claim 15, wherein the queue information includes a count which is, among the commands stored in the first queue, a number of commands each of which the first attribute is a first type.

17. The operating method according to claim 16, wherein the setting of the second attribute comprises:
- setting the second attribute to a reordered attribute when the first attribute of the first command is of the first type or the count is greater than 0; and
- setting the second attribute to an out-of-order attribute when the first attribute of the first command is a second type and the count is 0.

18. The operating method according to claim 15, wherein the removing of the first command comprises:
- prohibiting, when the second attribute is a reordered attribute, removal of the first command from the first queue until a command having a turn that is earlier than the first command is removed from the first queue.

19. The operating method according to claim 15, wherein the removing of the first command comprises:
- removing, when the second attribute is an out-of-ordered attribute, the first command from the first queue regardless of a turn of the first command in the first queue.

* * * * *